US011286957B2

(12) United States Patent
Alonso-Miralles

(10) Patent No.: US 11,286,957 B2
(45) Date of Patent: Mar. 29, 2022

(54) METHOD FOR INSERTING SEPTUM INTO ACOUSTIC LINER

(71) Applicant: ROHR, INC., Chula Vista, CA (US)

(72) Inventor: Jose S Alonso-Miralles, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 1065 days.

(21) Appl. No.: 16/025,596

(22) Filed: Jul. 2, 2018

(65) Prior Publication Data
US 2020/0003230 A1 Jan. 2, 2020

(51) Int. Cl.
F04D 29/66 (2006.01)
B32B 3/12 (2006.01)
B32B 3/28 (2006.01)
B32B 15/08 (2006.01)
B32B 15/20 (2006.01)
G10K 11/168 (2006.01)
F01D 9/00 (2006.01)

(52) U.S. Cl.
CPC .............. *F04D 29/664* (2013.01); *B32B 3/12* (2013.01); *B32B 3/28* (2013.01); *B32B 15/08* (2013.01); *B32B 15/20* (2013.01); *G10K 11/168* (2013.01); *B32B 2307/102* (2013.01); *F01D 9/00* (2013.01); *F05D 2220/32* (2013.01); *F05D 2230/60* (2013.01); *F05D 2250/283* (2013.01); *F05D 2260/96* (2013.01); *F05D 2300/121* (2013.01); *F05D 2300/133* (2013.01); *F05D 2300/60* (2013.01)

(58) Field of Classification Search
CPC .. B32B 15/20; B32B 3/12; B32B 3/28; B32B 15/08; G10K 11/168; F05D 2220/32; F05D 2230/60; F05D 2250/283; F05D 2260/96; F05D 2300/121; F05D 2300/133; F05D 2300/60; F04D 29/664; F01D 9/00
USPC ........................................................ 181/288
See application file for complete search history.

(56) References Cited

U.S. PATENT DOCUMENTS

| 4,167,598 | A | * | 9/1979 | Logan | ..................... | E04B 1/803 |
| | | | | | | 428/34.1 |
| 4,500,583 | A | * | 2/1985 | Naul | ..................... | B29D 24/005 |
| | | | | | | 428/116 |
| 4,817,757 | A | * | 4/1989 | Perret | ................... | G10K 11/172 |
| | | | | | | 181/224 |
| 5,057,176 | A | * | 10/1991 | Bainbridge | ............... | B31F 1/36 |
| | | | | | | 156/222 |
| 6,274,216 | B1 | | 8/2001 | Gonidec et al. | | |
| 8,047,329 | B1 | | 11/2011 | Douglas et al. | | |
| 8,607,924 | B2 | * | 12/2013 | Ichihashi | ............. | G10K 11/162 |
| | | | | | | 181/292 |
| 9,469,985 | B1 | | 10/2016 | Ichihashi | | |

(Continued)

OTHER PUBLICATIONS

European Patent Office, European Search Report dated Nov. 22, 2019 in Application No. 19179507.9.

*Primary Examiner* — Forrest M Phillips
(74) *Attorney, Agent, or Firm* — Snell & Wilmer L.L.P.

(57) ABSTRACT

An acoustic liner that may be for a turbofan engine may comprise a first sidewall, a second sidewall, wherein the first sidewall and the second sidewall define a plurality of cells disposed therebetween, and a pre-cut septum ribbon comprising a plurality of permeable septum coupled together via a plurality of connecting members, with each one of the plurality of permeable septum being generally in a respective one of the plurality of cells.

17 Claims, 5 Drawing Sheets

(56) References Cited

U.S. PATENT DOCUMENTS

| | | | |
|---|---|---|---|
| 9,492,792 B2* | 11/2016 | Tomescu | B01D 69/04 |
| 9,505,200 B2 | 11/2016 | Braden et al. | |
| 9,931,825 B2 | 4/2018 | Gerken et al. | |
| 2013/0062143 A1* | 3/2013 | Ichihashi | G10K 11/162 |
| | | | 181/292 |
| 2013/0220731 A1* | 8/2013 | Ayle | F02C 7/045 |
| | | | 181/222 |
| 2015/0290920 A1* | 10/2015 | Braden | B32B 37/146 |
| | | | 156/210 |

* cited by examiner

METHOD FOR INSERTING SEPTUM INTO ACOUSTIC LINER

FIELD

The present disclosure relates to an acoustic liner and more particularly to a double degree of freedom (DDOF) acoustic liner that extends noise attenuation capability to a wider frequency range.

BACKGROUND

A gas turbine engine may include an acoustic liner for attenuating noise generated during engine operation. A typical acoustic liner includes a honeycomb core connected between a solid face sheet and a perforated face sheet, also known as a single degree of freedom (SDOF), locally reacting, liner. This honeycomb core includes a plurality of resonating cavities. The honeycomb core may have a height that tunes the resonating cavities to a specific target frequency of the noise to be attenuated. It is possible to stack up layers of these resonating cavities by placing a permeable sheet or septum that separates each cavity into two interconnected chambers. This construction is known as a DDOF acoustic liner and has the capability of extending the frequency bandwidth of noise attenuation.

SUMMARY

An acoustic liner according to one, non-limiting, embodiment of the present disclosure includes a first sidewall, a second sidewall, wherein the first sidewall and the second sidewall at least partially define a plurality of cells disposed therebetween, and a pre-cut septum ribbon comprising a plurality of permeable septa coupled together via a plurality of connecting members, with each one of the plurality of permeable septa being generally within a respective one of the plurality of cells.

In various embodiments, each connecting member in the plurality of connecting members is contacting with and coupled between the first sidewall and the second sidewall.

In various embodiments, each septum in the plurality of permeable septa is facing a first direction.

In various embodiments, each connecting member in the plurality of connecting members is facing a second direction.

In various embodiments, the acoustic liner further comprises a first panel and a permeable panel spaced from the first panel, wherein the first sidewall and the second sidewall extend between and engage to the first panel and the permeable panel.

In various embodiments, the first sidewall is engaged to the second sidewall.

In various embodiments, the first sidewall and the second sidewall are each one continuous, folded, panel.

In various embodiments, the perimeter of each septum in the plurality of permeable septa interferes with the first sidewall and the second sidewall.

In various embodiments, the first sidewall and the second sidewall are corrugated.

A method for manufacturing an acoustic liner according to one, non-limiting, embodiment of the present disclosure comprises disposing a pre-cut septum ribbon comprising a plurality of permeable septa between a first sidewall and a second sidewall, coupling the first sidewall to the second sidewall, thereby forming a plurality of cells therebetween, and fixing the pre-cut septum ribbon between the first sidewall and the second sidewall, and twisting each of the plurality of permeable septa with respect to the first sidewall.

In various embodiments, the method further comprises bonding each septum to at least one of the first sidewall and the second sidewall.

In various embodiments, the method further comprises cutting the pre-cut septum ribbon from a mesh sheet.

In various embodiments, the pre-cut septum ribbon is disposed between the first sidewall and the second sidewall such that the pre-cut septum ribbon, the first sidewall, and the second sidewall are parallel to a first axis, and each of the plurality of permeable septa are substantially perpendicular with the first axis in response to being twisted with respect to the first sidewall.

In various embodiments, the method further comprises coupling a first panel to the first sidewall and the second sidewall.

In various embodiments, the method further comprises coupling a second panel to the first sidewall and the second sidewall, wherein the first sidewall and the second sidewall are disposed between the first panel and the second panel.

An acoustic liner according to one, non-limiting, embodiment of the present disclosure includes a first sidewall, a second sidewall, wherein the first sidewall and the second sidewall define a plurality of cells disposed therebetween, and a pre-cut septum ribbon comprising a plurality of permeable septa coupled together via a plurality of connecting members, with each one of the plurality of permeable septa being generally in a respective one of the plurality of cells.

In various embodiments, the first sidewall and the second sidewall are corrugated.

In various embodiments, each permeable septum in the plurality of permeable septa face a first direction and the plurality of connecting members face a second direction.

In various embodiments, the first sidewall is folded about a plurality of first edges extending along the first direction, the second sidewall is folded about a plurality of second edges extending along the first direction, the plurality of first edges are coupled to the plurality of second edges, and each of the plurality of connecting members are disposed between a respective one of the first plurality of edges and the second plurality of edges.

In various embodiments, the first sidewall is at least one of bonded or welded to the second sidewall.

In various embodiments, wherein a perimeter of each septum in the plurality of septa interferes with the first sidewall and the second sidewall.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
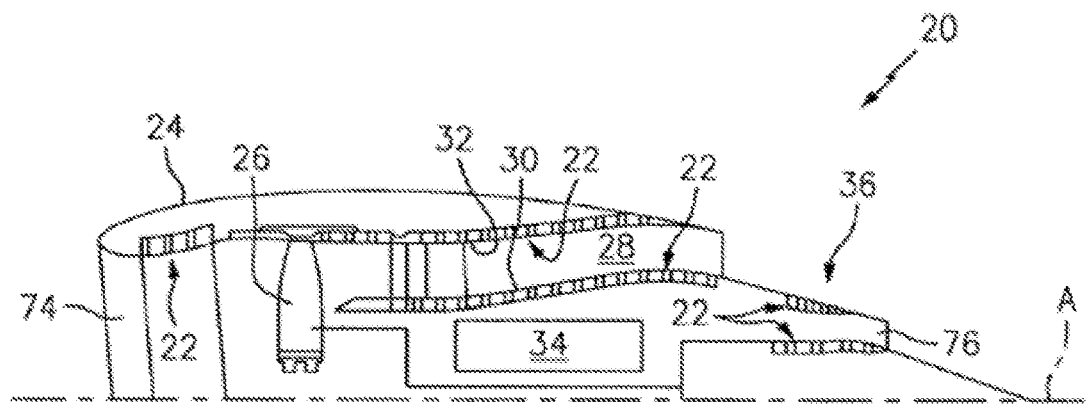
FIG. 1 is a partial cross section of a turbofan engine including at least one acoustic liner of the present disclosure, in accordance with various embodiments.

Referring to FIG. 1, a turbofan engine 20 is illustrated as one example of an application using an acoustic liner 22 of the present disclosure. The engine 20 is centered about an axis A, and includes a nacelle intake cowling 24, a fan section 26 downstream of the intake cowling 24, an annular air bypass flowpath 28 downstream of the fan section 26 and generally defined between radial inner and outer walls 30, 32, an engine core 34 located radially inward of the inner wall 30, and an exhaust nozzle 36 located downstream of the engine core 34. The acoustic liner 22 may be carried by a radially inward facing wall of the intake cowling 24, the inner wall 30, the outer wall 32, and/or the exhaust nozzle 36 to suppress noise in the respective vicinities. It is further contemplated and understood that the acoustic liner 22 may be applied to any other application where noise suppression, and particularly lowfrequency noise suppression, is desirable.

XYZ axes are provided in various figures for ease of illustration. In various embodiments, the Z-axis is referred to herein as a first axis, the Y-axis is referred to herein as a second axis, and the X-axis is referred to herein as a third axis.

Figure 2:
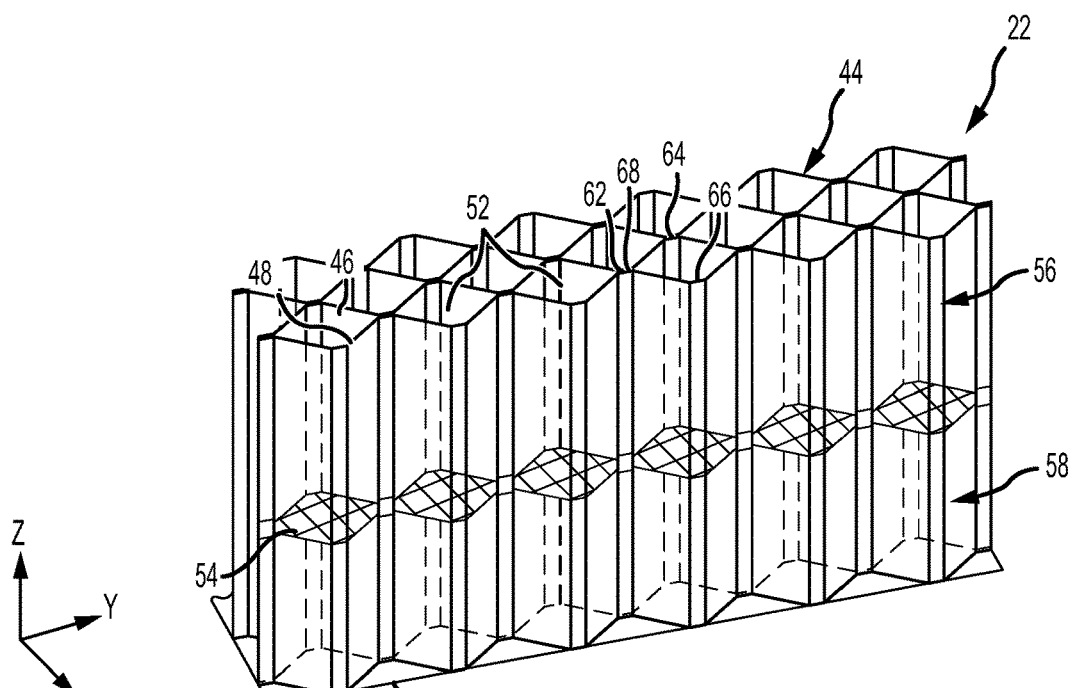
FIG. 2 is a partial perspective view of the acoustic liner with a permeable panel removed to show internal detail, in accordance with various embodiments.
Figure 3:
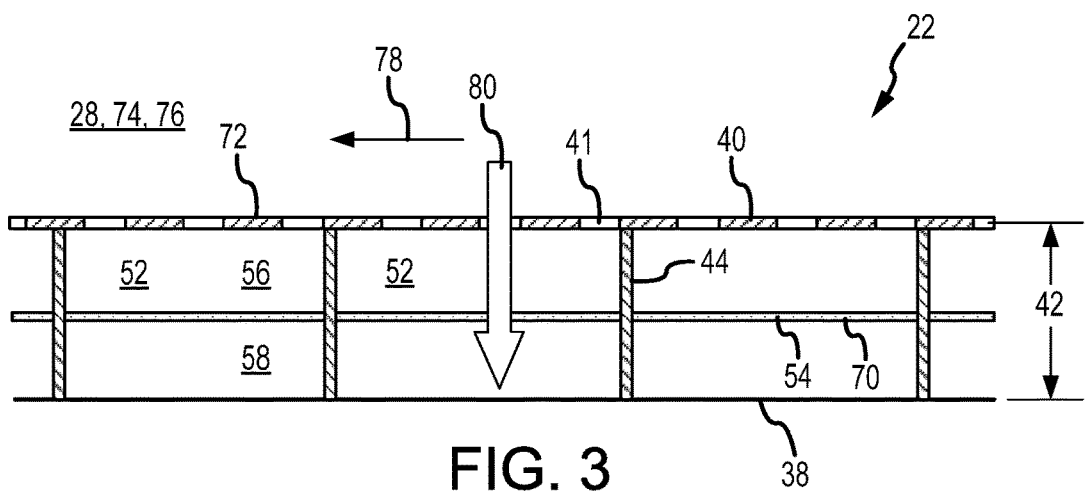
FIG. 3 is a partial cross section of the acoustic liner of FIG. 2, in accordance with various embodiments.

Referring to FIGS. 2 and 3, the acoustic liner 22 may have a non-permeable back panel (also referred to herein as a first panel) 38 and a permeable panel (also referred to herein as a second panel) 40 that is parallel to and spaced from the panel 38 by a distance (see arrow 42). A plurality of corrugated sidewalls 44 extend between and engage to the panels 38, 40. The corrugated sidewalls 44 are disposed between non-permeable back panel 38 and permeable panel 40. The corrugated sidewalls 44 may be substantially normal to the panels 38, 40. A first corrugated sidewall 46 may be coupled to a second corrugated sidewall 48. A plurality of cells 52 of the acoustic liner 22 are defined by and between the corrugated sidewalls 46, 48, and between panels 38, 40. A plurality of permeable septum 54 extend longitudinally (i.e., along the Y-direction in FIG. 2) between the plurality of sidewalls 44 and define a first chamber 56 and a second chamber 58 within each cell 52. The periphery of each permeable septum 54 may be engaged to the corrugated sidewalls 46, 48.

Each corrugated sidewall 44 may be coupled to an adjacent corrugated sidewall 44. For example, a first edge 62 of corrugated sidewall 46 is coupled to a respective second edge 68 of corrugated sidewall 48. Similarly, a second edge 64 of corrugated sidewall 46 may be coupled to a respective first edge of an adjacent corrugated sidewall. Furthermore, a first edge 66 of corrugated sidewall 48 may be coupled to a respective first edge of an adjacent corrugated sidewall. Each corrugated sidewall 46, 48 may be one continuous fold panel, folded along the respective first edges 62, 66 and again at the respective second edges 64, 68.

Although illustrated as quadrilateral cells 52, corrugated sidewalls 44 may be formed to define any geometry of cells 52, including hexagonal, octagonal, triangular, or circular, among others.

In various embodiments, the plurality of corrugated sidewalls 44 may be manufactured from a metal, such as aluminum or titanium for example. In various embodiments, the plurality of corrugated sidewalls 44 may be manufactured from composite materials.

The permeable panel 40 has a plurality of holes 41 with at least one hole communicating with each respective cell 52. The permeable septum 54 may have a plurality of holes 70. It is further contemplated and understood that the holes 41, 70 may be, or achieved through, perforations, a mesh layer, a combination of a perforated layer and a mesh layer, a screen or other type of skin that permits the passage of air. It is also understood that with the combination of the permeable panel 40 and the permeable septum 54, the acoustic liner 22 may behave as a double degree of freedom (DDOF) liner with the permeable septum 54 being a DDOF septum, and use of the corrugated sidewalls 44 generally make the liner a local reacting liner. Stated differently, the permeable septum 54 defines first chamber 56 and second chamber 58 within each cell 52.

With further regard to the turbofan engine 20 application (see FIG. 1), the permeable panel 40 of the acoustic liner 22 is a perforated panel having an outer face 72 that may define, in-part, an air passage such as, for example, the generally cylindrical intake passage 74 of the intake cowling 24. In various embodiments, the face 72 may define, at least in-part, the bypass flowpath 28 and/or an exhaust channel 76 of the exhaust nozzle 36. It should be appreciated to those skilled in the art that the physical dimensions of the acoustic liner 22 may be altered or tuned to suppress targeted resonating frequency bandwidths without departing from the novelties of the present disclosure. For instance, the liner 22 may be tuned to suppress the relatively high frequency bandwidths emitted from a turbine section of the engine core 34, or may be tuned to suppress the lower frequency bandwidths emitted from a combustor section of the engine core 34. In various embodiments, the permeable septum 54 may be positioned at any height (along the Z-direction) within each cell 52.

The acoustic liner 22 may be made of any variety of materials depending upon a particular application including metals, composites and ceramics. For instance, if the acoustic liner 22 is applied to the exhaust nozzle 36 of the turbofan engine 20, a liner made of ceramic may be desirable to withstand exposure to high temperatures. The liner may be manufactured using any variety and combinations of known manufacturing techniques; and, for more complex liner structures may be manufactured using, at least in-part, an additive manufacturing process, for example powder bed fusion, material extrusion, sheet lamination, and directed energy deposition, among others.

In operation, an airstream flows across the outer face 72 and in a shearing direction (see arrow 78) with respect to the acoustic liner 22. Noise from this airstream generally enters each cell 52 along an air/sound path (see arrow 80), through the hole(s) 41 in the permeable panel 40, into the cell 52, and through the holes 70 in the permeable septum 54.

Figure 4:
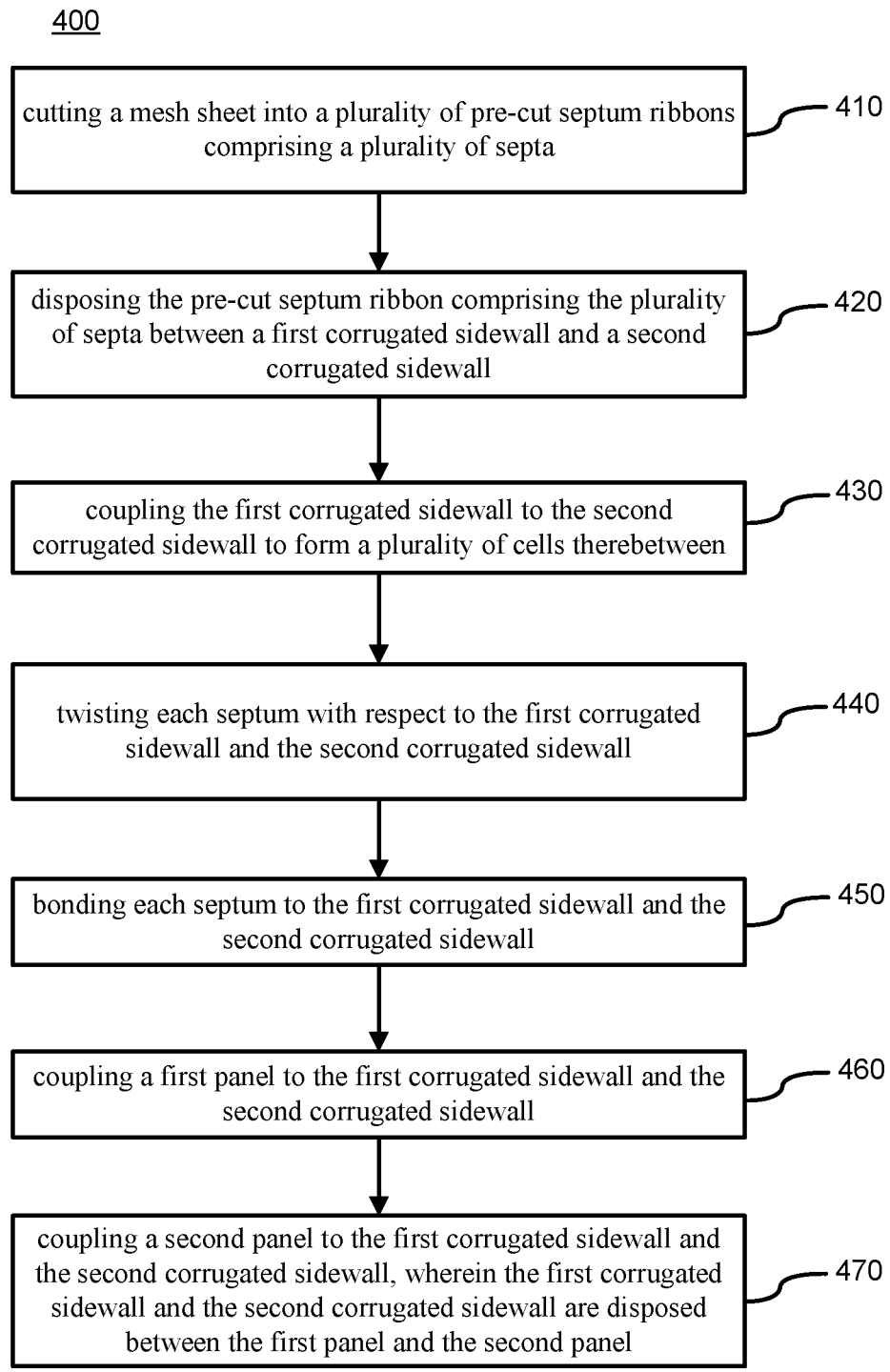
FIG. 4 illustrates a flow chart for a method for manufacturing an acoustic liner, in accordance with various embodiments.

With reference to FIG. 4, a method 400 for manufacturing an acoustic liner is illustrated, in accordance with various embodiments. Method 400 includes cutting a mesh sheet into a plurality of pre-cut septum ribbons comprising a plurality of septa (step 410). Method 400 includes disposing the pre-cut septum ribbon comprising the plurality of septa between a first corrugated sidewall and a second corrugated sidewall (step 420). Method 400 includes coupling the first corrugated sidewall to the second corrugated sidewall to form a plurality of cells therebetween (step 430). Method 400 includes twisting each septum with respect to the first corrugated sidewall and the second corrugated sidewall (step 440). Method 400 includes bonding each septum to the first corrugated sidewall and the second corrugated sidewall (step 450). Method 400 includes coupling a first panel to the first corrugated sidewall and the second corrugated sidewall (step 460). Method 400 includes coupling a second panel to the first corrugated sidewall and the second corrugated sidewall, wherein the first corrugated sidewall and the second corrugated sidewall are disposed between the first panel and the second panel (step 470).

Figure 5A:
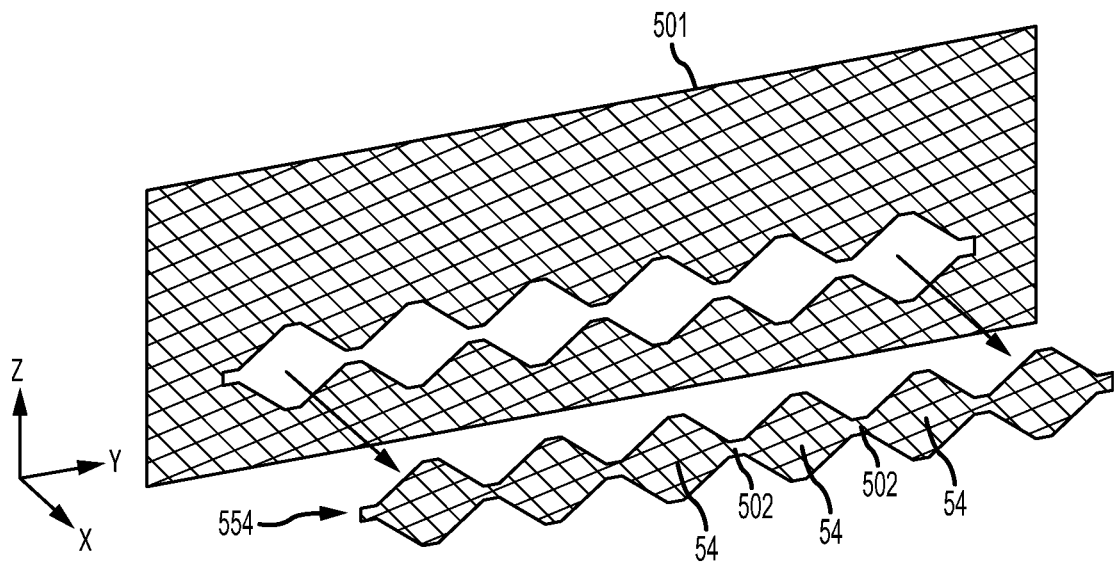
FIG. 5A illustrates a pre-cut septum ribbon cut from a mesh sheet, in accordance with various embodiments.

With combined reference to FIG. 4 and FIG. 5A, step 410 may include cutting a mesh sheet 501 into a plurality of pre-cut septum ribbons 554 comprising a plurality of permeable septum 54. Each permeable septum 54 may be connected by a connecting member 502. In various embodiments, the mesh sheet 501 may be comprised of a metal.

Figure 5B:
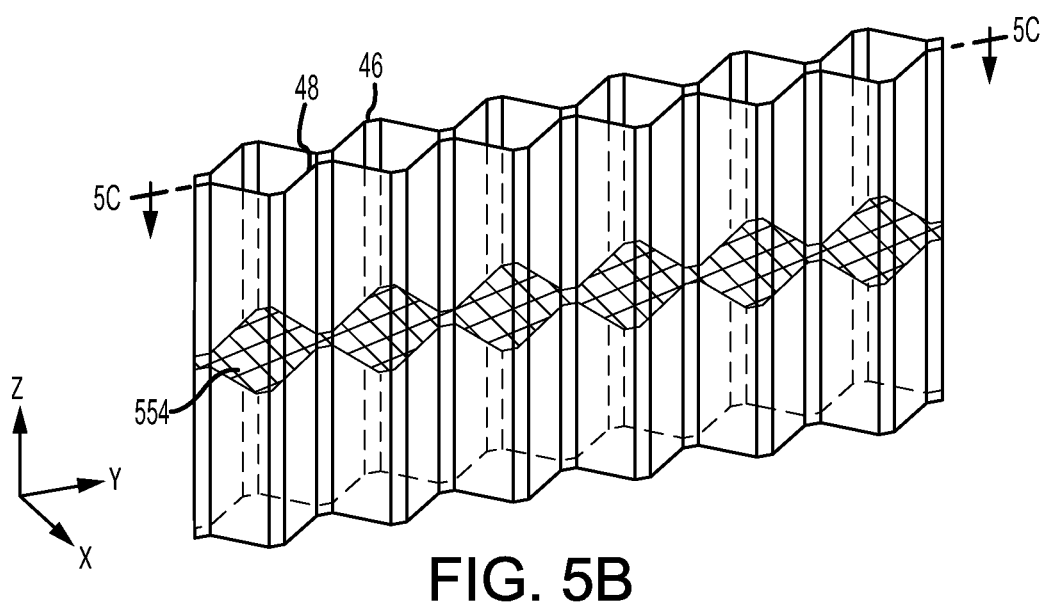
FIG. 5B and FIG. 5C illustrate a pre-cut septum ribbon disposed between a first corrugated panel and a second corrugated panel, in accordance with various embodiments.
Figure 5C:
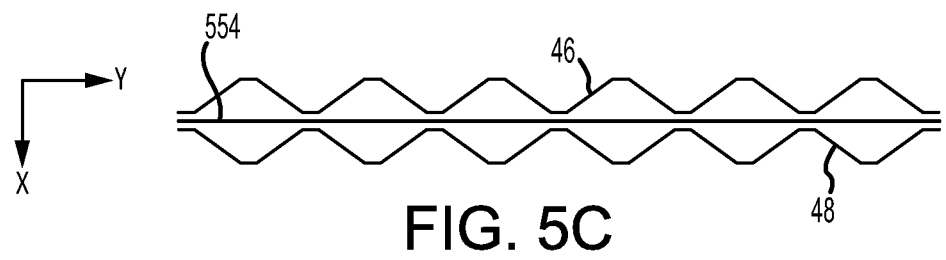

With combined reference to FIG. 4, FIG. 5B, and FIG. 5C, step 420 may include disposing the pre-cut septum ribbon 554 between first corrugated sidewall 46 and a second corrugated sidewall 48. In FIG. 5B, pre-cut septum ribbon 554 may be oriented parallel with the YZ-plane. The pre-cut septum ribbon 554, the first corrugated sidewall 46, and the second corrugated sidewall 48 may be positioned parallel to the Z-axis.

Figure 5D:
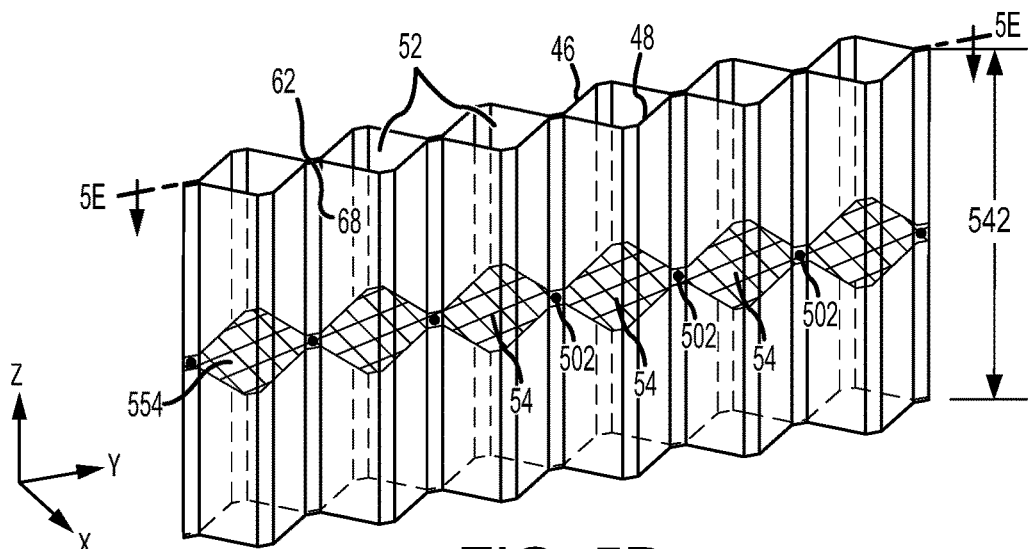
FIG. 5D and FIG. 5E illustrate the first corrugated panel coupled to the second corrugated panel with the pre-cut septum ribbon attached therebetween, in accordance with various embodiments.
Figure 5E:
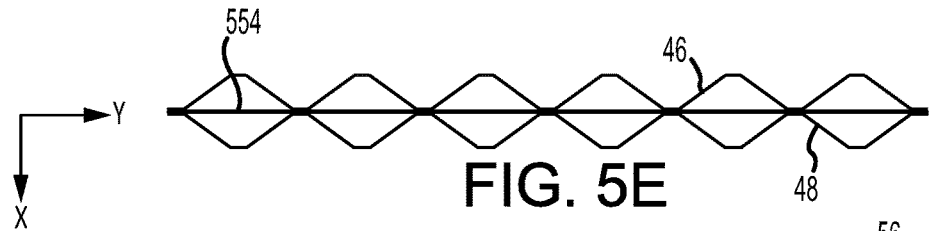

With combined reference to FIG. 4, FIG. 5D, and FIG. 5E, step 430 may include coupling corrugated sidewall 46 to corrugated sidewall 48 to form a plurality of cells 52 therebetween. In various embodiments, corrugated sidewall 46 is welded to corrugated sidewall 48. In various embodiments, corrugated sidewall 46 is bonded to corrugated sidewall 48. The first edge 62 of corrugated sidewall 46 may be coupled to the second edge 68 of corrugated sidewall 48. The first edge 62 of corrugated sidewall 46 may be coupled to the second edge 68 of corrugated sidewall 48 along the entire height (see arrow 542) of corrugated sidewalls 46, 48. In this regard, each connecting member 502 may be fixed between corrugated sidewall 46 and corrugated sidewall 48. Each septum 54 may remain unsecured from corrugated sidewall 46 and corrugated sidewall 48, other than via each connecting member 502.

Figure 5F:
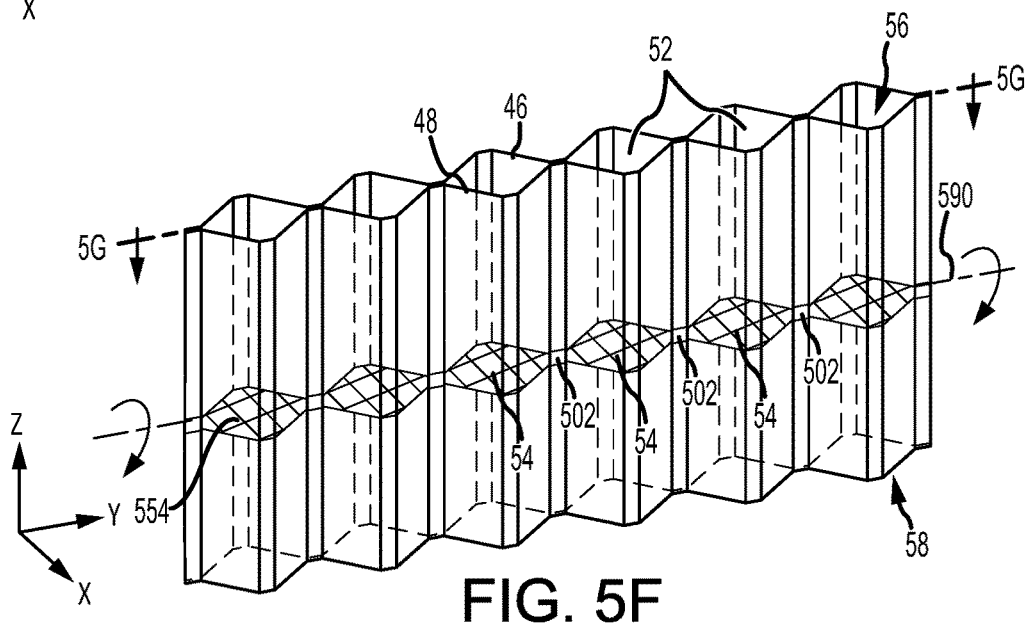
FIG. 5F and FIG. 5G illustrate a plurality of septa of the pre-cut septum ribbon twisted to an installed position with respect to the first corrugated panel and the second corrugated panel, in accordance with various embodiments.
Figure 5G:
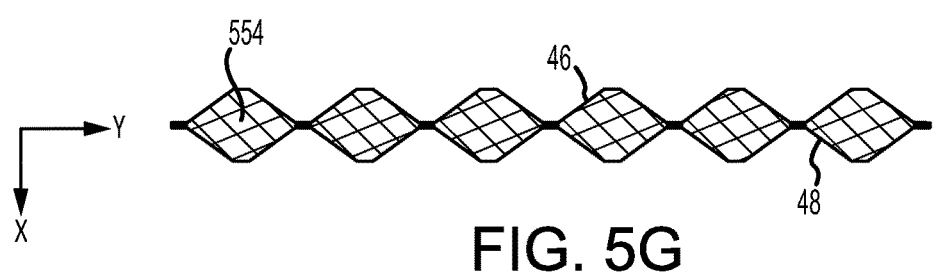

With combined reference to FIG. 4, FIG. 5F, and FIG. 5G, step 440 may include twisting each septum 54 with respect to corrugated sidewall 46 and corrugated sidewall 48 such that the perimeter of each septum 54 interferes with corrugated sidewall 46 and corrugated sidewall 48. In various embodiments, each septum 54 is twisted individually. In various embodiments, each septum 54 is twisted simultaneously. A tool may be used to reach into each cell 52 to twist the septum 54. Each septum 54 may be twisted along centerline axis 590 of pre-cut septum ribbon 554. Each septum 54 may be twisted along centerline axis 590 such that each septum 54 is oriented substantially perpendicular to corrugated sidewall 46 and corrugated sidewall 48 (i.e., oriented parallel with the XY-plane). Stated differently, each septum 54 may be rotated substantially perpendicular to their original orientation such that each septum 54 is then defined by planes according to the Y-X axes. As each septum 54 is twisted, the connecting members 502 may remain fixed between corrugated sidewall 46 and corrugated sidewall 48. Stated differently, each septum 54 may twist with respect to the connecting members 502. After being twisted to the installed position, each septum 54 may face a first direction (e.g., Z-direction) and each connecting member 502 may face a second direction (e.g., X-direction). In this regard, pre-cut septum ribbon 554 may be bent, distorted, stretched, torn, severed, or the like, at the location of each connecting member 502 during the twisting process.

Figure 6:
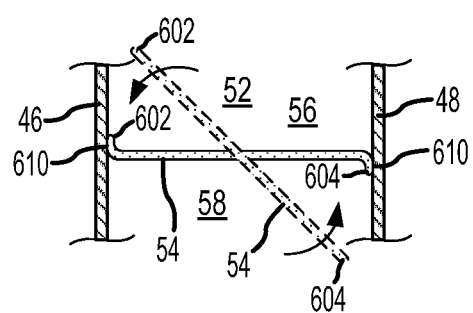
FIG. 6 illustrates an oversized septum twisted to an installed position with opposing ends of the septum folded against and bonded to the corresponding corrugated walls, in accordance with various embodiments.

With combined reference to FIG. 4 and FIG. 6, step 450 may include bonding each septum 54 to corrugated sidewall 46 and corrugated sidewall 48. In various embodiments, each septum 54 may be sized such that the perimeter of the septum 54 interferes with corrugated wall 46 and/or corrugated wall 48 after being twisted according to step 440. Each septum 54 may be sized such that an end 602 of the septum 54 folds against corrugated wall 46 and an opposite end 604 of septum 54 folds against corrugated wall 48 during the twisting process. An adhesive 610 may be applied between end 602 and corrugated wall 46 and between end 604 and corrugated wall 48 to secure septum 54 in the installed position. In various embodiments, the adhesive 610 is applied before the twisting process. In various embodiments, the adhesive 610 is applied during the twisting process. In various embodiments, the adhesive 610 is applied after the twisting process.

With combined reference to FIG. 4 and FIG. 3, step 460 may include coupling panel 38 to corrugated sidewalls 44. In various embodiments, panel 38 is bonded to corrugated sidewalls 44. In various embodiments, step 460 may include coupling panel 40 to corrugated sidewalls 44. In various embodiments, panel 40 is bonded to corrugated sidewalls 44.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An acoustic liner comprising:
   A first sidewall;
   A second sidewall, wherein the first sidewall and the second sidewall at least partially define a plurality of cells disposed therebetween; and
   A unitary pre-cut septum ribbon comprising a plurality of permeable septa and a plurality of connecting members coupling the plurality of permeable septa together, with each one of the plurality of permeable septa being generally within a respective one of the plurality of cells,
   Wherein each septum in the plurality of permeable septa is facing a first direction, each connecting member in the plurality of connecting members is facing a second direction, and the first direction is substantially perpendicular to the second direction.

2. The acoustic liner set forth in claim 1, wherein each connecting member in the plurality of connecting members is contacting with and coupled between the first sidewall and the second sidewall.

3. The acoustic liner set forth in claim 1, further comprising:
   a first panel; and
   a permeable panel spaced from the first panel, wherein the first sidewall and the second sidewall extend between and engage to the first panel and the permeable panel.

4. The acoustic liner set forth in claim 1, wherein the first sidewall is engaged to the second sidewall.

5. The acoustic liner set forth in claim 1, wherein the first sidewall and the second sidewall are each one continuous, folded, panel.

6. The acoustic liner set forth in claim 1, wherein the perimeter of each septum in the plurality of permeable septa interferes with the first sidewall and the second sidewall.

7. The acoustic liner set forth in claim 1, wherein the first sidewall and the second sidewall are corrugated.

8. A method for manufacturing an acoustic liner, comprising:
   Disposing a unitary pre-cut septum ribbon between a first sidewall and a second sidewall, the unitary pre-cut septum ribbon comprising a plurality of permeable septa and a plurality of connecting members coupling the plurality of permeable septa together;
   Coupling the first sidewall to the second sidewall, thereby forming a plurality of cells therebetween, and fixing the unitary pre-cut septum ribbon between the first sidewall and the second sidewall; and
   Twisting each of the plurality of permeable septa with respect to the first sidewall such that at least a portion of a perimeter of each of the plurality of permeable septa interferes with the first sidewall and the second sidewall.

9. The method set forth in claim 8, further comprising bonding each septum to at least one of the first sidewall and the second sidewall.

10. The method set forth in claim 8, further comprising cutting the unitary per-cut septum ribbon to form a mesh sheet.

11. The method of claim 8, wherein the unitary pre-cut septum ribbon is disposed between the first sidewall and the second sidewall such that the unitary pre-cut septum ribbon, the first sidewall and the second sidewall are parallel to a first axis, and each of the plurality of permeable septa are substantially perpendicular with the first axis in response to being twisted with respect to the first sidewall.

12. The method set forth in claim 8, further comprising:
  coupling a first panel to the first sidewall and the second sidewall; and
  coupling a second panel to the first sidewall and the second sidewall, wherein the first sidewall and the second sidewall are disposed between the first panel and the second panel.

13. An acoustic liner comprising:
  A first sidewall;
  A second sidewall, wherein the first sidewall and the second sidewall define a plurality of cells disposed therebetween; and
  A unitary pre-cut septum ribbon comprising a plurality of permeable septa coupled together via a plurality of connecting members, with each one of the plurality of permeable septa being generally in a respective one of the plurality of cells,
  Wherein the first sidewall is folded about a plurality of first edges along a first direction, the second sidewall is folded about a plurality of second edges along the first direction, each one of the plurality of first edges are in contact with a respective one of the second plurality of edges.

14. The acoustic liner set forth in claim 13, wherein the first sidewall and the second sidewall are corrugated.

15. The acoustic liner set forth in claim 14, wherein each permeable septum in the plurality of permeable septa face a first direction and the plurality of connecting members face a second direction.

16. The acoustic liner set forth in claim 15, wherein the first sidewall is at least one of bonded or welded to the second sidewall.

17. The acoustic liner set forth in claim 13, wherein a perimeter of each septum in the plurality of septa interferes with the first sidewall and the second sidewall.

* * * * *